J. ALLEN.
Clover Huller.
No. 12,372.
Patented Feb. 13, 1855.
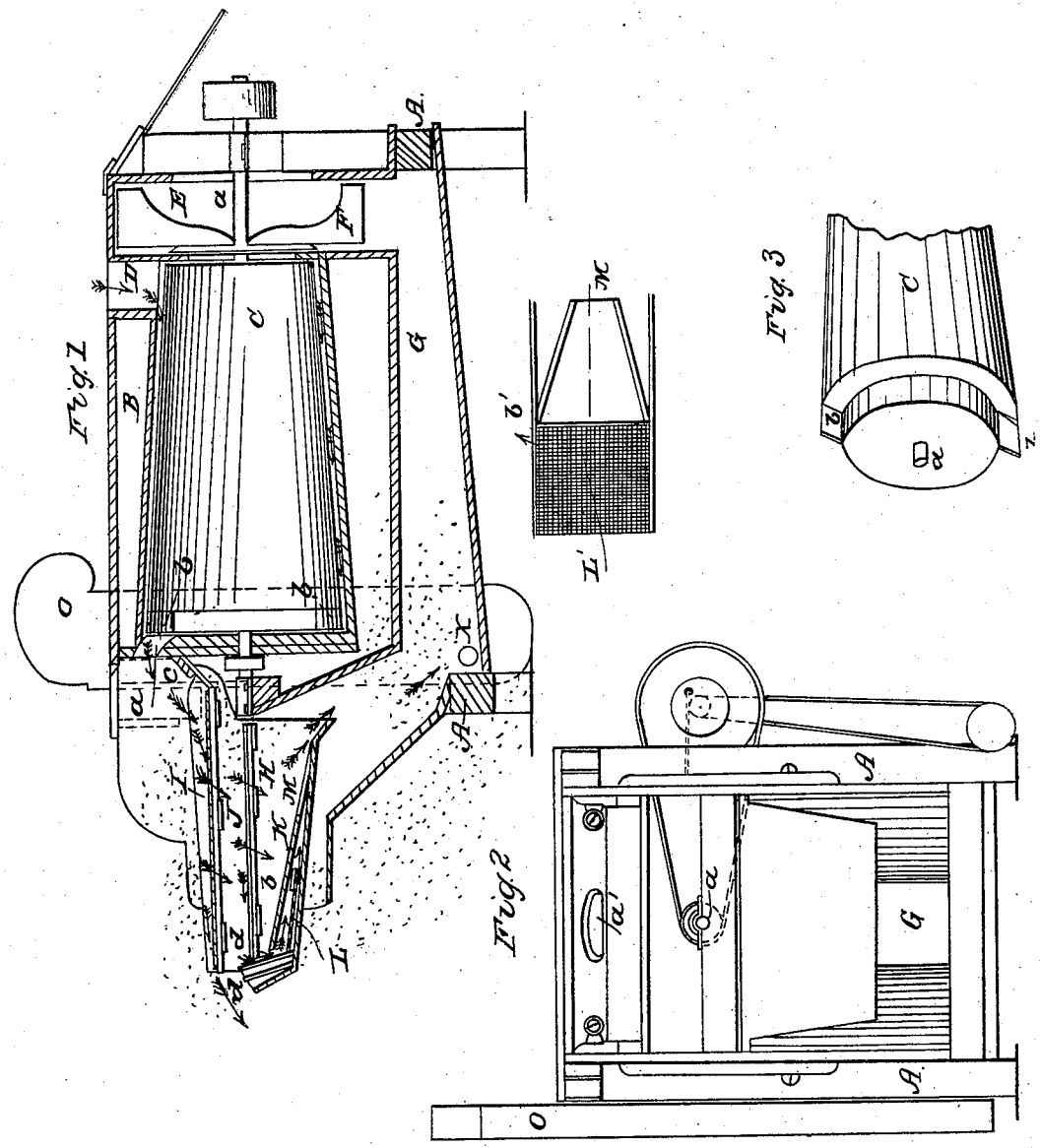

UNITED STATES PATENT OFFICE.

JAMES ALLEN, OF FREASES STORE, OHIO.

CLOVER-HULLER.

Specification of Letters Patent No. 12,372, dated February 13, 1855.

*To all whom it may concern:*

Be it known that I, JAMES ALLEN, of Freases Store, in the county of Stark and State of Ohio, have invented a new and Improved Separator for Separating Clover; and I do hereby declare that the following is a full, clear, and exact description of the construction and operation of the same, reference being had to the accompanying drawings, making a part of this specification, in which—

Figure 1, is a longitudinal vertical section of my improved separator; the line of section being taken through the center of the machine; the threshing cone is not bisected. Fig. 2, is a front view of the same; the screens being removed. Fig. 3, is a section of the cone, showing the wings or revolving elevators which carry or throw the seed and hulls upon the upper screen. Fig. 4, is a plan or top view of the bottom of the shoe.

Similar letters of reference indicate corresponding parts, in each of the several figures.

The nature of my invention consists in a peculiar arrangement of tail boards, at the outer end of the shoe; and a chamber or passage containing a screen at the bottom of the shoe; by which arrangement the seed is prevented from passing off the upper screen with the chaff, and is perfectly separated, as will be hereinafter shown.

To enable those skilled in the art to make and use my invention, I will proceed to describe its construction and operation.

A, represents the frame of the machine, constructed in any proper manner; the said frame has secured upon it a conical shell, B, see Fig. 1, in which shell is a conical thresher, C, having upon it any proper teeth or beaters for threshing the clover. The inner surface of the shell is also provided with teeth or beaters of any approved form. The teeth or beaters on the shell and conical thresher are not represented, as they are well known to all agricultural implement makers.

D, is a hopper, at the upper part of the machine, and communicating with the interior of the shell, B.

E, is a fan box, at the back end of the shell, B, provided with a fan, F, which is upon the axis, ($a$), of the conical thresher. The fan box communicates with a passage, G, the bottom of which is inclined, as shown in Fig. 1. The outer end of the passage, G, turns upward. The passage, G, conveys the blast generated by the fan, F, to the shoe, which will be described hereafter.

The outer or large end of the conical thresher, C, has a recess or rabbet turned in it, as shown in Fig. 3. On this rabbet are placed wings or buckets, ($b$), ($b$), two or more. These wings or buckets convey or throw the threshed clover and hulls upon the upper screen in the shoe.

H, is the shoe, the inner end of which is connected by a pivot, C, to the outer end of the shell, B. In the upper part of the shoe, are two screens, I, J; and underneath the lower screen, J, there is an inclined bottom, K.

At the outer end of the shoe, are two tail boards, ($d$), ($d$), which are fitted in grooves, in the sides of the shoe, H. These tail boards work or fit loosely in the grooves, and may be drawn out or shoved in the proper distance, as desired.

Underneath the inclined bottom, K, there is a screen, L; and, M, is an aperture through the lower end of the inclined bottom, K; said aperture, M, communicating with the space beneath the screen, L.

Operation: The seed is placed in the hopper, D, and is threshed from the straw and heads, by means of the conical thresher, C, and shell, B. The seed and hulls pass down, of course, to the larger end of the shell, B, and are carried or thrown upon the upper screen, I, in the shoe, H; the seed and hulls passing through the aperture, ($a^1$), in the outer end of the shell; see Figs. 1, and 2. The screen, I, is somewhat inclined; and the chaff and hulls pass over the depressed end of the screen, I, and fall upon the floor or ground. The seed passes through the screen, I, and falls upon the lower screen, J, and through it upon the inclined bottom, K, and passes down the inclined bottom, K, into the blast passage, G; the blast blowing out all the dust and dirt from the seed. The tailings pass off the depressed end of the screen, J, and enter the space underneath the inclined bottom, K, and upon the screen, L. Any seed that may happen to pass into this space, with the tailings, falls through the screen, L, and passes through the aperture, M, and falls into the blast passage, G. The tailings pass out of the aperture, ($b^1$), at the side of the shoe, above the screen, L; the said screen, L, not allowing the tailings to pass through it; see Fig. 4. The tail boards, by being properly adjusted according to the strength of the blast, prevent the seed from being blown out of the shoe, with the chaff or hulls. The bottom of the passage, G, being inclined, the seed will collect at the point, X, (seen in Fig. 1,) and drop into the elevators inclosed by the box, O. Any proper receptacle may be placed at the upper end of the elevator-box, O, to receive the seed. The usual shake motion is given to the shoe, in any proper manner.

By the above arrangement, it will be seen that the seed may be perfectly separated from the hulls and tailings, and in a simple manner.

I do not claim adjustable tail boards in separators nor inclined guide boards for receiving and conducting the seeds to their receptacle, nor do I claim a "tailing screen" except under an arrangement like that above set forth.

What I do claim is—

The arrangement of the two tail boards (d) (d) in combination with the tailing screen L, so arranged under the inclined board K, that it shall be out of the way of the blast and yet deliver the seed at M into the main receptacle, and the tailings out at its side through the aperture b; it being understood that the outer and inner tail boards must be adjusted respectively with reference to the screens I and J, all as set forth.

JAMES ALLEN.

Witnesses:
H. W. STAMBAUGH,
SAMUEL JARVIS.